DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 12

T940,022
PRESSURIZED AND FILTERED XEROGRAPHIC SYSTEM
John C. Rodda, Webster, N.Y., assignor to Xerox Corporation, Stamford, Conn.
Filed June 26, 1974, Ser. No. 483,346
Int. Cl. G03g *15/00*
U.S. Cl. 355—3
1 Sheet Drawing. 11 Pages Specification

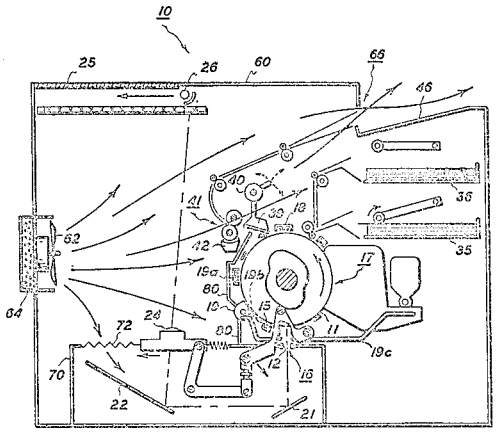

An electrostatographic copying system is contained within an air enclosure which is slightly positively air pressurized relative to its ambient surroundings to reduce both internal and external contamination of system components and provide a controlled internal air flow pattern. A blower blows air into the machine enclosure through a filter which filters contaminants which would otherwise contribute to photoreceptor image deletions. A separate optics system enclosure can be indirectly pressurized inside the main enclosure. An air shield is positioned to prevent the internal air flow from causing contaminants such as fumes from the fuser from striking the photoreceptor. The air is preferably exhausted through the copy sheet exit at the opposite side of the enclosure, and through the vacuum sheet pick-off system. Internal pressure of less than 0.1 inch of water sustained by about 20 cfm is appropriate. Amine contaminants causing selenium alloy photoreceptor image deletions are removed by filter materials such as activated charcoal or Hopcalite.

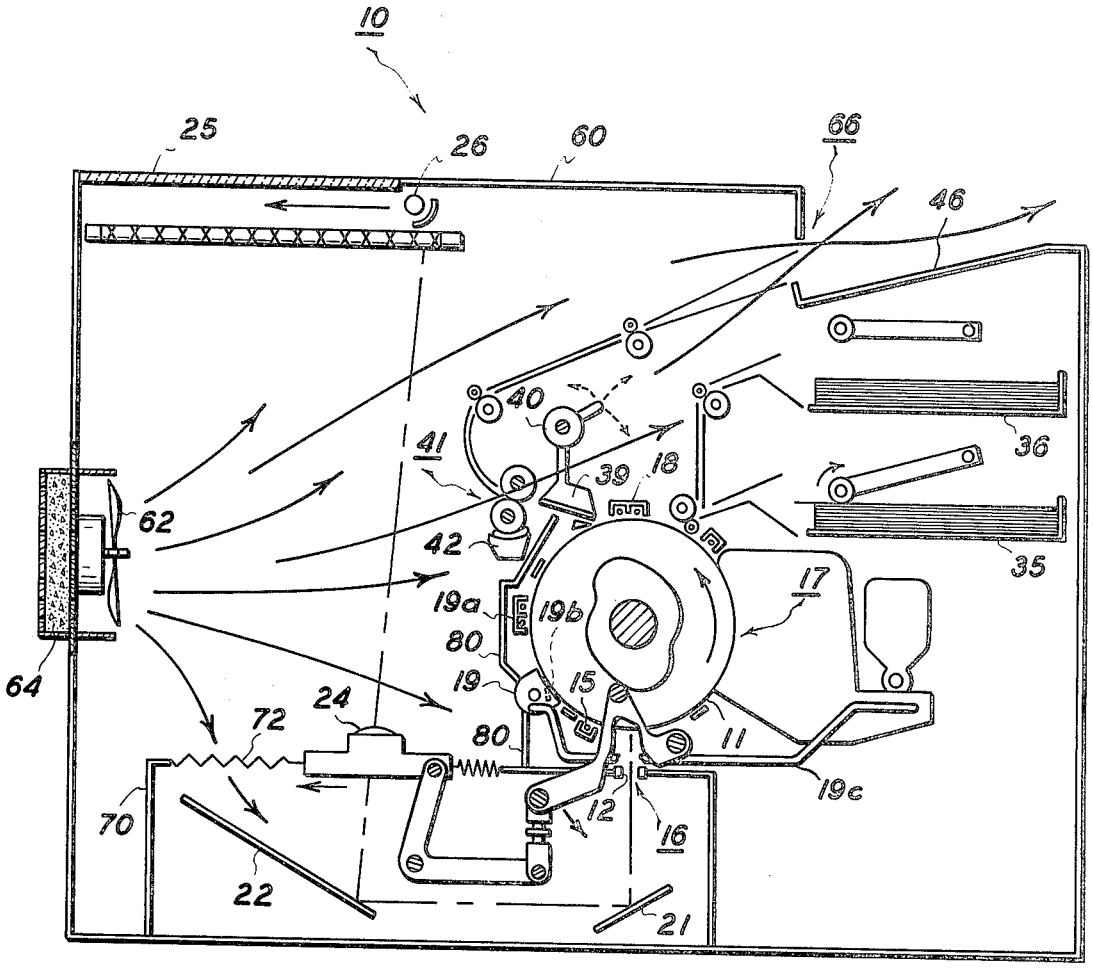

Nov. 4, 1975
J. C. RODOA
PRESSURIZED AND FILTERED
XEROGRAPHIC SYSTEM
Original Filed June 26, 1974
T940,022